HOLDERS FOR ELECTRONIC COMPONENTS

Filed Oct. 6, 1954

INVENTORS
JOSEPH KAUFMAN
CLARENCE P. SKENES
BY
W. E. Thibodeau, A. W. Dew + J. D. Edgerton
ATTORNEYS

United States Patent Office 2,809,004

Patented Oct. 8, 1957

2,809,004

HOLDERS FOR ELECTRONIC COMPONENTS

Joseph Kaufman and Clarence P. Skenes, Washington, D. C., assignors to the United States of America as represented by the Secretary of the Army Application October 6, 1954, Serial No. 460,788

4 Claims. (Cl. 248—300)

(Granted under Title 35, U. S. Code (1952), sec. 266)

The invention described herein may be manufactured and used by or for the Government for governmental purposes without the payment to us of any royalty thereon.

This invention relates to devices for holding electronic components in position in electronic assemblies. The invention provides improved spring-clip holding devices adapted to hold components very firmly, even under conditions of sever shock and vibration.

In some applications where high reliability is particularly important—airborne and mobile military equipment, for example—electronic assemblies are subjected to severe vibration and shock, and experience has shown that vibration and shock are major obstacles to the attainment of maximum reliability. Under these severe conditions, components may be shifted from their initial positions, causing alteration of circuit operating characteristics; serious resonances may be set up in individual components; components may fracture or undergo changes in their individual characteristics; and wire leads may fatigue and break.

Many article-holding devices of a spring-clip type are known. See U. S. Patents 904,928 to W. J. Boemper for Attachment for Safety Fuzes; 1,608,289 to E. A. Bacon for Fuse Clip Clamp; 1,171,730 to F. W. Gibson for Spring Clip; 1,906,874 to A. I. Platt for Implement Holder; 1,953,807 to J. G. Jackson et al. for Fuse Clip; 2,380,114 to M. Kurillo for Mounting for Electric Fuses; and 2,555,053 to G. H. Myrick et al. for Article Holding Device.

Despite the many known types of spring-clip holding devices, the electronic art has long felt the need for an economical, convenient device of this type for holding components—particularly electron tubes, resistors, and condensers—under conditions of severe vibration. Various known devices have been tried for this purpose with indifferent success. Our invention meets this need, providing a holding action under severe vibration far superior to that provided by any device previously known or used for this purpose.

The principal object of our invention is to provide, for the mounting and holding of electronic components of generally circular cross section—including resistors, capacitors, tubes, and cylindrically-cased inductances, transformers, and relays——holding devices and methods that will afford very firm holding of the component under conditions of severe shock and vibration and that will at the same time afford the following additional advantages in combination: (1) economy; (2) saving of space; (3) convenience; (4) ready removability of the component from the holder in the event that replacement of the component is needed; (5) efficient conduction of heat from the component to the body on which the holder is mounted; and (6) automatic adaptation to thermally-caused dimensional changes, so as to minimize thermal stresses between component and holder even when rapid and extreme temperature changes are encountered.

Other objects, uses, aspects, and advantages of the invention will become apparent from the following description and from the accompanying drawing, in which—

Figure 1:
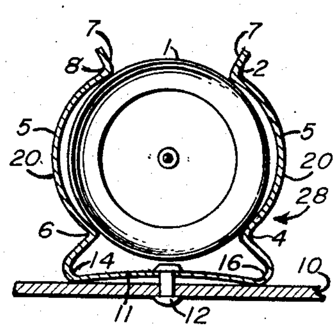
Figure 1 is a cross-sectional view of a preferred embodiment of the holder of the invention.
Figure 2:
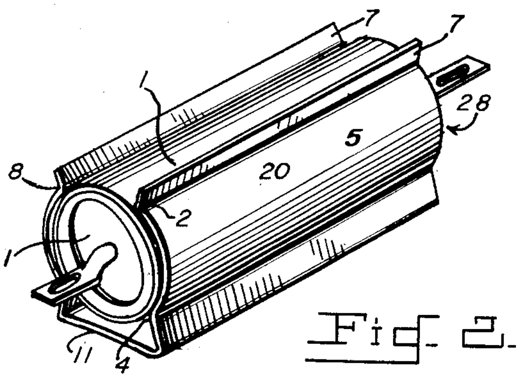
Figure 2 is a perspective view of a capacitor mounted in the holder of the invention.

Referring to Figs. 1 and 2, the spring-clip component holder 28 shown is formed from a single piece of sheet metal having suitable spring properties. The holder 28 comprises a base section 11 for attachment to a chassis or mounting surface, and two side sections 20 adapted to grip a component 1 pressed into position from above. The clip must have sufficient resiliency to permit component 1 to be snapped into position from above and to then embrace the component with a strong grip having high immunity to shock and vibration. Furthermore, the material must not fatigue and weaken under the influence of prolonged severe vibration. We have searched for materials meeting these essential requirements, and we have found beryllium, copper and certain steels to be most suitable. Furthermore, we have discovered that to meet these requirements holder 28 must be formed in the annealed state and then tempered to a suitable hardness. We prefer to use SAE #1060–1070 steel and to temper it to a hardness of 38–42 Rockwell.

Still referring to Fig. 1 and 2, the side sections 20 of holder 28 are bowed in their centers to form sockets 5 that make four-line pressure contact with component 1 at points 2, 4, 6, and 8. It will be noted that this four-line pressure contact is attributable to socket 5 having a lesser radius of curvature than component 1. The base section 11 of the holder 28 is preferably held to chassis 10 by a line of two or more rivets 12 running lengthwise of the holder. The base section 11 is initially curved upward in the center, so that the base makes two-line pressure contact with the chassis 10 at 14 and 16. Lips 7 are flared outwardly and diverge away from one another to facilitate insertion of the component 1 from above.

This four-line pressure contact that the holder 28 makes with the component 1, and the two-line contact that it makes with the chassis 10, are essential features of the invention and are to be particularly noted. These two features in combination contribute greatly to the very firm holding needed to withstand shock and vibration. The two-line pressure contact with the chassis 10 effectively prevents shifting or rolling of the holder 28 in relation to the chassis 10. The four-line clamping action on the component 1 resists both rolling and lengthwise shifting of the component 1, as well as lateral and vertical motion. Because the holder 28 extends most of the length of the component 1, torsional motion in any plane is effectively prevented.

It will be seen that the total space occupied by the holder 28 and component 1 together is only slightly greater than that occupied by the component 1 alone.

Like other spring-clip holders, this holder 28 will automatically adjust to thermally-caused dimensional changes; even if the coefficients of thermal expansion of holder 28 and component 1 differ greatly, temperature changes will not cause the holder 28 to apply destructive stresses to the component 1.

It will be understood that the holder 28 of the invention provides an improved path for the flow of heat away from the component 1 and into the chassis 10. We have found that when resistors are held in our holders they will dissipate much more power, before reaching their maximum permissible operating temperature, than they will in free air.

The holder 28 as described and shown in Figs. 1 and 2 is excellent for the firm and vibration-resistant holding of components, like tubular condensers and resistors, which are in the shape of cylinders that are relatively free from diametric irregularities. As will further appear below, it can also be used to hold cables, pipes, tubing, and the like. The glass envelopes of electron tubes present a somewhat different problem, however. For one thing, tube manufacturers' specifications permit much wider variations in diameter from tube to tube of the same type than are encountered in resistors and capacitors. Furthermore, although individual resistors and capacitors are in general substantially free from diametric irregularities, this is not true of most individual tubes. Also, of course, glass tube envelopes tend to be more fragile than resistors and condensers. For these reasons it is desirable to provide a somewhat modified clip for the vibration-free holding of glass-envelope tubes.

Figures 3, 4:
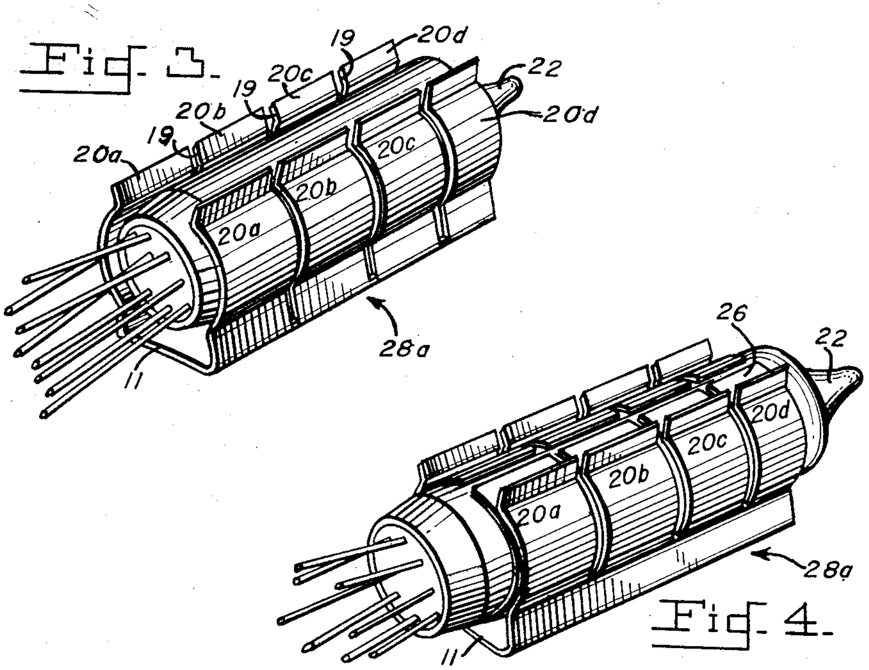
Figure 3 is a perspective view of a glass-envelope electron tube mounted in a serrated holder in accordance with the invention.
Figure 4 is a perspective view of a glass-envelope electron tube surrounded by a split-ring sleeve and held in the serrated holder of Fig. 3.

Fig. 3 shows a subminiature tube 22 mounted in such a modified holder 28*a*. The modification consists of one or more slots 19 that divide the sides of the holder 28*a* into two or more pairs of opposed side sections or fingers 20*a*, 20*b*, 20*c*, and 20*d*. These slots or cuts are made at right angles to the long dimension of the holder 28*a*. The cuts extend down through the sides to, but not into, the base 11 of the holder; the base 11 remains unmodified. Mounting is preferably by rivets in the center of each pair of opposed side sections or fingers, so that each pair—pair 20*b*, for example—provides an independent grip. The result is a holder that has all the advantages of the unmodified holder, plus the additional advantage that it tends to adjust automatically to diametric irregularities in an electron tube or other fragile component. Remarkably firm holding is thus provided, while excessive stress concentrations are avoided.

Referring to Fig. 4, it is sometimes desirable to provide a split-ring sleeve 26 that is slipped over a component 22 before the component is pressed into the holder 28*a*. Such a sleeve can have several advantages. It can modify stresses and distribute the pressure of the four-line contact over wider areas. If made of metal it greatly facilitates conduction of heat to the chassis. It can improve the electrical shielding of the component. The split in the sleeve permits the sleeve to adjust readily to the component. When a sleeve is used in conjunction with a slotted holder, the sleeve is preferably slotted similarly.

Figure 5:
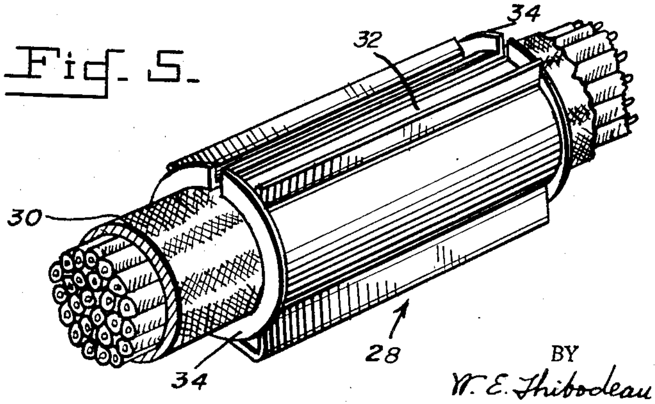
Figure 5 is a perspective view of a cable, surrounded by a sleeve having flanges to prevent longitudinal motion, held in a holder in accordance with the invention.

Referring to Fig. 5, this figure shows how the method and devices of the invention can be applied to the holding of wires and cables. In the example shown, a split tubular sleeve 32 preferably having a flange 34 at each end has been slipped over wire or cable 30 and then snapped into a spring-clip holder 28. Flanges 34 fit over the ends of holder 28 to make it impossible for the sleeve to move in the holder 28.

The use of this method and device for holding wires and cables has important advantages. The wires are held more firmly, less subject to vibration and motion that may lead to damage to the insulation or breakage of the wire. The holders can be fastened in place in advance on the surface on which the wiring is to be held, outlining the path that the wiring is to follow. They can be used in applications in which drilling and fastening of clips after the wiring is in place—as is done in previous methods—would be difficult or dangerous. The additional space required for the holders adds very little to the space required by the cable alone.

It will be apparent that the embodiments shown are only exemplary and that various modifications can be made in construction and arrangement within the scope of the invention as defined in the appended claims.

We claim:

1. A spring-clip holding device for fastening to a substantially flat mounting surface, and for receiving and holding firmly, under conditions of relatively severe vibration, a substantially cylindrical member, said holding device comprising in combination: a base section adapted to provide two-line pressure contact with said relatively flat mounting surface; opposed side sections extending integrally from said base section, said opposed side sections and said base section being formed from a single piece of sheet metal possessing resilience; said base section having top and bottom surfaces and having a substantially rectangular configuration, said base section having major and minor axes, the dimension of said base section along said major axis being longer than the dimension of said base section along said minor axis, said base section being bowed along the major axis thereof so that the said bottom surface of said base section is substantially concave, said base section having a plurality of holes positioned along the major axis of said base section; said opposed side sections each projecting substantially upwardly from said base section substantially along the entire length of said base section, said opposed side sections each having first portions adjacent said base section extending the length of said base section and bent towards each other to form acute angles with said base section, said opposed side sections having second portions extending from each of said first portions, said second portions being bowed away from each other for the length of said side sections, said opposed side sections having outer lip portions extending from each of said second portions and diverging away from one another, said substantially cylindrical member interposed between said second portions of said opposed side sections, the radius of curvature of said second portions being less than the radius of curvature of said member, and said opposed side sections providing substantially four-line pressure contact with said member.

2. A spring-clip holding device according to claim 1 wherein each of said opposed side sections is cut through the outer lip portion to substantially the base section along a plurality of spaced planes, said planes being substantially perpendicular to said base section, to provide a plurality of diametrically opposed pairs of fingers from said opposed side sections so that said opposed side sections are adapted to adjust automatically to diametric irregularities in said member, and said holes being so positioned that a hole is located substantially in the center of each portion of said base section defined by said planes.

3. A spring-clip holding device for fastening to a substantially flat mounting surface, and for receiving and holding firmly, under conditions of relatively severe vibration, a substantially cylindrical member, said holding device comprising in combination: a base section; opposed side sections extending integrally from said base section; a substantially cylindrical longitudinally split sleeve disposed between said side sections; said base section adapted to provide two-line pressure contact with said relatively flat mounting surface; said opposed side sections and said base section being formed from a single piece of sheet metal possessing resilience; said base section having top and bottom surfaces and having a substantially rectangular configuration, said base section having major and minor axes, the dimension of said base section along said major axis being longer than the dimension of said base section along said minor axis, said base section being bowed along the major axis thereof so that said bottom surface of said base section is substantially concave, said base section having a plurality of holes positioned along the major axis of said base section; said opposed side sections each projecting substantially upwardly from said base section substantially along the entire length of said base section, said opposed side section each having first portions adjacent said base section extending the length of said base section and bent towards each other to form acute angles with said base section, said opposed side sections having second portions extending from each of said first portions, said second portions being bowed away from each other for the length of said side sections, the radius of curvature of said second portions being less than the radius of curvature of said sleeve, said opposed side sections having outer lip portions extending from each of said second portions and diverging away from one another, and said opposed side sections providing substantially four-line pressure contact with said sleeve.

4. A spring-clip holding device according to claim 3 wherein each of said opposed side sections is cut through the outer lip portion to substantially the base section along a plurality of spaced planes, said planes being substantially perpendicular to said base section to provide a plurality of diametrically opposed pairs of fingers from said opposed side sections, and said holes being so positioned that a hole is located substantially in the center of each portion of said base section defined by said planes, said sleeve being provided with substantially equally spaced fingers as said opposed side sections so that said sleeve and said opposed side sections are adapted to adjust automatically to diametric irregularities in said member.

References Cited in the file of this patent

UNITED STATES PATENTS

| | | |
|---|---|---|
| 541,420 | Bookhart | June 18, 1895 |
| 825,332 | Mack | July 10, 1906 |
| 1,518,848 | Hickox | Dec. 9, 1924 |
| 1,718,316 | Swenson | June 25, 1929 |
| 1,789,276 | Kenney | Jan. 13, 1931 |
| 2,005,882 | Arnold | June 25, 1935 |
| 2,334,706 | Ingalls | Nov. 23, 1943 |
| 2,541,828 | Peck | Feb. 13, 1951 |
| 2,697,577 | Wolf | Dec. 21, 1954 |